(Model.) 2 Sheets—Sheet 1.
C. R. HEIZMANN.
APPLE PARER.
No. 245,949. Patented Aug. 23, 1881.
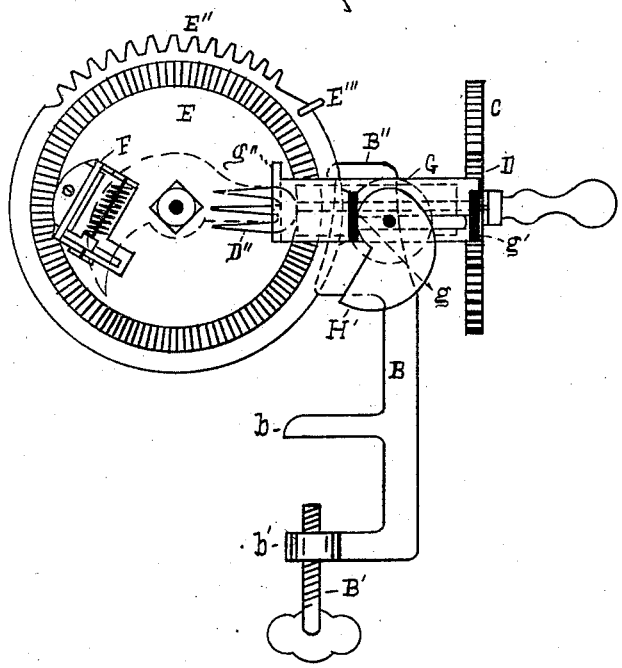
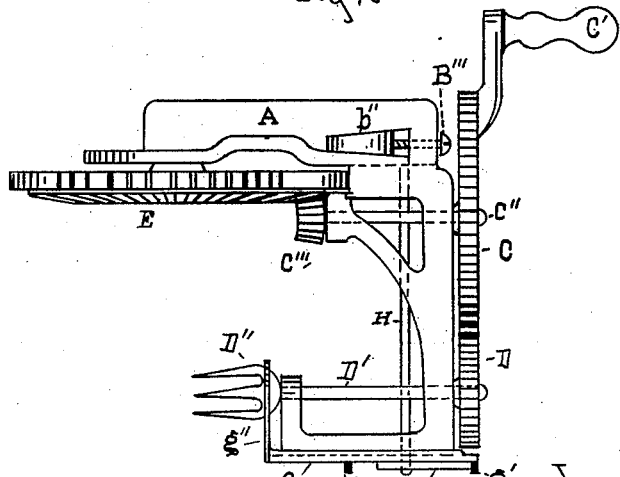
Witnesses
Frank P. Kinsey
Gw Banks
Inventor
C. Raymond Heizmann
per Thomas P. Kinsey Atty (Model.) 2 Sheets—Sheet 2.
C. R. HEIZMANN.
APPLE PARER.
No. 245,949. Patented Aug. 23, 1881.
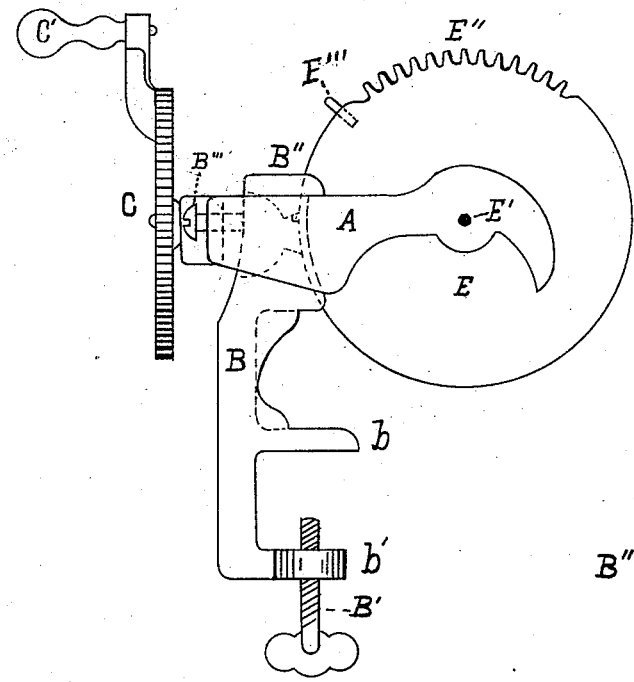
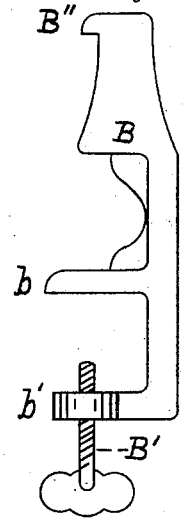
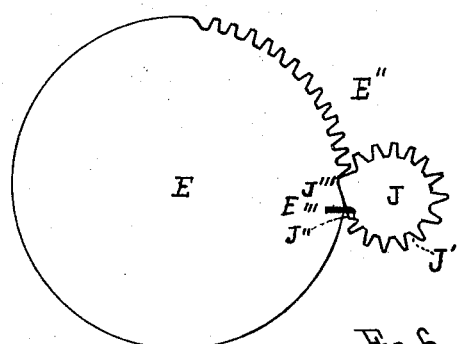
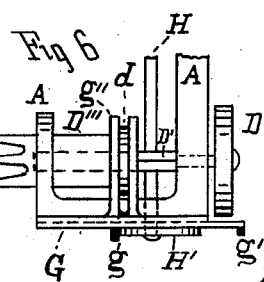
Witnesses
Frank P. Kinsey
Inventor
C. Raymond Heizmann
Per Thomas P. Kinsey, Atty.

UNITED STATES PATENT OFFICE.

C. RAYMOND HEIZMANN, OF READING, PENNSYLVANIA, ASSIGNOR TO PENN HARDWARE COMPANY, OF SAME PLACE.

APPLE-PARER.

SPECIFICATION forming part of Letters Patent No. 245,949, dated August 23, 1881.

Application filed November 26, 1880. (Model.)

*To all whom it may concern:*

Be it known that I, C. RAYMOND HEIZMANN, of the city of Reading, county of Berks, State of Pennsylvania, have invented a new and useful Improvement in Fruit-Paring Machines, of which the following is a specification.

This invention relates more particularly to that class of parers provided with an arrangement for discharging the fruit from the fork after it has been pared.

To enable others skilled in the art to make and use my invention, I will now describe its construction and operation.

Figure 1 is a front elevation of an ordinary turn-table fruit-parer with my improvement attached. Fig. 2 is a plan of the same. Fig. 3 is a back view, showing the removable clamping pillar or stand. Fig. 4 is a front view with the frame and clamping-stand removed, showing the arrangement of gear by which the reciprocating movement is given to the fruit-discharger. Fig. 5 is a view of the clamping pillar or stand. Fig. 6 is an alternative device for discharging the fruit.

Similar letters in all the figures refer to similar parts.

The improvements are adapted to be attached to any of the ordinary turn-table parers in the market, without restriction as to size or form, and may be operated in various ways to suit the views of the user.

The parer is constructed, as represented in the drawings, with a detachable frame, A, having suitable bearings for the reception of the shafts D', E', and H. The shaft D' has at one end the fork D'', and at the other end the spur-pinion D, which is in gear with the spur-wheel C, mounted upon the shaft C'', at the opposite end of which is the bevel-pinion C'''; this gears with the usual turn-table wheel, E, mounted on the shaft or pin E'. The turn-table wheel E is of the disk construction, and has the disk extended outside of the periphery of the bevel-driven teeth, forming a concentric cam, broken for about one-third of its circumference by spur-teeth E'', and provided with an arm, E''', on the advance side of the wheel. The teeth E'' gear with the teeth J' of the cam-pinion J, which is mounted on the shaft H, the pinion being so constructed with cam J''' and post J'' that as the wheel E is revolved, its teeth in contact with those of the pinion J, the shaft H is carried around until the cam-projection J''' is brought in contact with the plain or untoothed portion of the periphery of the wheel. This brings the shaft H to rest, in which condition it remains until, in the continued revolution, the arm E''' of the wheel E comes in contact with the post J'' of the pinion J, throwing their respective teeth in gear, when another revolution of the shaft H is produced, and so continuously. At the opposite end of the shaft H, and in front of the frame A, is a sliding apron, G, having an oblong slot in its face, through which is passed the shaft H. The edges of the apron are returned over the frame A, which thus guides its reciprocating movement. It has also two ledges, $g\ g'$, upon its face next to the gear side of the frame, between which is secured, upon the shaft H, a snail-cam, H', both revolving together. At the end of the apron next to the fork D'' is a bifurcated projection, $g''$, of the same, having an opening large enough to clear the diameter of the fork and extending a short distance below it. The snail-cam H', revolving between the ledges $g\ g'$, will alternately project the bifurcated end $g''$ forward over the fork D'', and then retract it to its normal position against the frame A. This motion discharges the pared fruit from the fork.

The action of the machine as a whole will be apparent from the above description. The turning of the wheel C, (by the crank C',) its teeth in gear with the pinion D, sets in motion the fork D'', and with it the fruit to be pared. At the same time the bevel-pinion C''' operates upon the bevel-teeth of the table-wheel E, carrying with it the knife E. The latter is held by a spring in contact with the fruit to be pared until, in its revolution, the wheel E brings the tail of the knife-lever (which projects through its disk) in contact with a raised surface on the frame A, back of the wheel. This compels the knife to leave the fruit, which remains upon the fork D'' until the teeth of wheel and pinion interlock, when the snail H', revolving, carries the discharging-arm $g''$ forward and releases the fruit from the fork.

To facilitate packing of the parers for shipment, I have adopted the clamping pillar or standard B, which is provided at the lower end with the arms $b\ b'$, the latter, as usual, having a pinching-screw, B', to secure it to the table. The top of the standard B is formed wedge shape in section, and has a gib-head, B''. It is inserted in a corresponding-shaped mortise, $b''$, in the frame A, the gib-head projecting through and overlapping the top of the frame A, and it is securely held in place by a screw, B''', which is in contact with the back of the wedge-sectioned top. This makes a simple and solid connection between the two portions of the machine, and one of easy arrangement for use or for packing up.

In place of the discharging device which I have described, and to which I give preference, the plan shown in Fig. 6 may be used, in which the shaft D' is squared from inside of the frame A on the gear side to the outside of the frame on the fork side. The fork itself is formed on the end of a sleeve sliding loosely upon the shaft D', and has a collar, $d$, at the opposite end, the usual front journal-box being enlarged to permit the sleeve D''' to slide freely therein. The apron G, instead of having the bifurcated arm $g''$ in front of the frame A, has its position inside of the frame, next to and embracing the collar $d$ on the sleeve D'''. The snail H', with its shaft H, revolving between the ledges $g\ g'$, as before, transfers a reciprocating movement to the sleeve, which, retracting, brings the fruit against the frame A, and thus discharges it from the fork.

I do not claim the fruit-parer, nor any device for that purpose; neither do I lay claim to a parer having the clamping device separate from but attachable to the frame of the parer, as such are well-known, having been patented and for a long time used.

What I do claim as my invention, and desire to secure by Letters Patent, is as follows:

1. The combination, in a fruit-parer, with the frame A, of the sliding apron G, having ledges $g\ g'$ on its face, and a bifurcated reverse right-angled arm, $g''$, which, when at rest, is in contact with the frame A back of the fork D'', said apron having its edges turned over the frame A, and provided with an oblong slot of such size as will clear the shaft H and permit a longitudinal movement of the apron, for the purpose substantially as shown and described.

2. The snail or cam H', in combination with the apron G and ledges $g\ g'$, discharging the fruit from the fork D'' and retracting the apron, for the purpose substantially as described.

3. The combination of wheel E and pinion J of a fruit-parer having cam J''' and post J'', which, contracting previous to and in advance of their respective teeth, make a positive connection between the same, the proportion of plain to toothed periphery of both wheel and pinion being such that the pinion J, shaft H, cam or snail H', and apron G shall have a positive intermittent state of motion and of rest, substantially as and for the purpose described.

C. RAYMOND HEIZMANN.

Witnesses:
FRANK B. RULER,
F. M. BANKS.